(12) United States Patent
Turgeon

(10) Patent No.: US 10,810,584 B2
(45) Date of Patent: Oct. 20, 2020

(54) AUTHENTICATION PLATFORM FOR PIN DEBIT ISSUERS

(71) Applicant: CardinalCommerce Corporation, Mentor, OH (US)

(72) Inventor: Paul Turgeon, Chicago, IL (US)

(73) Assignee: CardinalCommerce Corporation, Mentor, OH (US)

( * ) Notice: Subject to any disclaimer, the term of this patent is extended or adjusted under 35 U.S.C. 154(b) by 275 days.

(21) Appl. No.: 13/765,003

(22) Filed: Feb. 12, 2013

(65) Prior Publication Data

US 2013/0212020 A1 Aug. 15, 2013

Related U.S. Application Data

(60) Provisional application No. 61/599,114, filed on Feb. 15, 2012.

(51) Int. Cl.
*G06Q 20/38* (2012.01)
*G06Q 20/40* (2012.01)
*G06Q 20/32* (2012.01)

(52) U.S. Cl.
CPC ..... *G06Q 20/3821* (2013.01); *G06Q 20/3223* (2013.01); *G06Q 20/385* (2013.01); *G06Q 20/401* (2013.01); *G06Q 20/407* (2013.01); *G06Q 20/409* (2013.01); *G06Q 20/4016* (2013.01)

(58) Field of Classification Search
CPC .. G06Q 20/40; G06Q 20/385; G06Q 20/4012; G06Q 20/10; G06Q 20/4016; G06Q 20/38
See application file for complete search history.

(56) References Cited

U.S. PATENT DOCUMENTS

| 6,807,410 B1 | 10/2004 | Pailles et al. |
| 7,051,002 B2 | 5/2006 | Keresman, III et al. |
| 7,260,724 B1 | 8/2007 | Dickinson et al. |

(Continued)

FOREIGN PATENT DOCUMENTS

| GE | 137486643 | 7/2019 |
| JP | 2002352165 A | 12/2002 |

(Continued)

OTHER PUBLICATIONS https://en.wikipedia.org/wiki/Futures_contract (Year: 2010).*

(Continued)

*Primary Examiner* — Richard C Weisberger
(74) *Attorney, Agent, or Firm* — The Webb Law Firm

(57) ABSTRACT

A system and method processes a transaction between a merchant and a consumer. Data indicate of the security of a digital processing device being used by the consumer to carry out the transaction with the merchant is received. A determination as to whether the digital processing device is secure is made using the received data. In response to determining the digital processing device is insecure, the transaction is aborted. In response to determining the digital processing device is in secure, the transaction is processed by at least one of authenticating the consumer, authorizing the transaction using a payment processing supply chain, and capturing funds for the transaction using a payment processing supply chain.

10 Claims, 3 Drawing Sheets

(56) References Cited

U.S. PATENT DOCUMENTS

| | | | |
|---|---|---|---|
| 7,693,783 | B2 | 4/2010 | Balasubramanian et al. |
| 8,533,118 | B2* | 9/2013 | Weller .................... G06F 21/31 |
| | | | 705/35 |
| 8,917,826 | B2* | 12/2014 | Bravo ................... H04L 61/106 |
| | | | 379/88.01 |
| 2002/0099649 | A1 | 7/2002 | Lee et al. |
| 2002/0108062 | A1 | 8/2002 | Nakajima et al. |
| 2003/0105710 | A1* | 6/2003 | Barbara ................. G06Q 20/04 |
| | | | 705/39 |
| 2004/0111640 | A1* | 6/2004 | Baum ................. H04L 61/2015 |
| | | | 726/13 |
| 2004/0236696 | A1 | 11/2004 | Aoki et al. |
| 2008/0016005 | A1 | 1/2008 | Owen et al. |
| 2008/0222038 | A1 | 9/2008 | Eden et al. |
| 2009/0240620 | A1 | 9/2009 | Kendrick et al. |
| 2010/0057623 | A1* | 3/2010 | Kapur et al. .................... 705/72 |
| 2010/0175116 | A1 | 7/2010 | Gum |
| 2010/0305993 | A1* | 12/2010 | Fisher ................ G06Q 10/0635 |
| | | | 705/7.28 |
| 2010/0327054 | A1* | 12/2010 | Hammad ................ G06F 21/34 |
| | | | 235/375 |
| 2011/0202466 | A1* | 8/2011 | Carter ................... G06Q 20/20 |
| | | | 705/67 |
| 2011/0246324 | A1* | 10/2011 | Keresman, III ....... G06Q 20/02 |
| | | | 705/26.41 |
| 2011/0246363 | A1 | 10/2011 | Stone |

FOREIGN PATENT DOCUMENTS

| | | |
|---|---|---|
| JP | 2004-348536 | 12/2004 |
| JP | 2005-208822 | 8/2005 |
| JP | 2010-097450 | 4/2010 |
| KR | 10-2011-0111800 | 10/2011 |
| WO | WO 01/88790 | 11/2001 |
| WO | WO 2011/127029 A1 | 10/2011 |

OTHER PUBLICATIONS

Kreyer N., Pousttchi, K., and Turowski, K., "Characteristics of Mobile Payment Procedures," in Proceedings of the Workshop at ISMIS'02, Z. Maamar, W. Mansoor, and W.-J. van den Heuvel (eds.), Lyon 2002.*

An Office Action/Search Report for related Application No. EP 13748664.3.

* cited by examiner

AUTHENTICATION PLATFORM FOR PIN DEBIT ISSUERS

This application claims the benefit of U.S. Provisional Application No. 61/599,114, filed Feb. 15, 2012, incorporated herein by reference in its entirety.

BACKGROUND

The present exemplary embodiment relates to electronic commerce (e-commerce) and mobile commerce (m-commerce). It finds particular application in conjunction with personal identification number (PIN) debit cards, and will be described with particular reference thereto. However, it is to be appreciated that the present exemplary embodiment is also amenable to other like applications.

By way of background, e-commerce relates to the buying and selling of products and/or services between consumers and merchants over the Internet or other like transactional exchanges of data. M-commerce, relates to the buying and selling of products and/or services between consumers and merchants over mobile telecommunications networks. The convenience of shopping over the Internet and mobile phones has sparked considerable interest in e-commerce and m-commerce on behalf of both consumers and merchants.

In the United States, the fastest growing card type is the PIN debit card. However, today there is no ubiquitous way to use PIN debit cards for e-commerce and/or m-commerce transactions. Even so, U.S. patent application Ser. No. 13/080,119, entitled "Method and System for Processing PIN Debit Transactions", filed Apr. 5, 2011, to Keresman, III et al. describes a system and method for processing e-commerce transactions using PIN debit cards.

Traditional PIN debit transactions initiated at brick and mortar merchant locations achieve integrity and security by at least: (1) securing the mechanism through which credentials are captured; (2) encrypting the PIN data while the transaction is in flight; and (3) passing the credentials to the issuer for validation. The system and method of Keresman et al. do not provide means for securing the mechanism through which credentials are captured. Therefore, security of an m-commerce or e-commerce transaction can be more readily compromised. For example, a key logger on a client computer initiating an m-commerce or e-commerce transaction using a PIN debit transaction can intercept a user's PIN.

The exemplary embodiment contemplates new and improved systems and/or methods which overcome the above-referenced problems and others.

INCORPORATION BY REFERENCE

The following commonly assigned applications, the disclosures of each being completely incorporated herein by reference, are mentioned:
U.S. Pat. No. 7,051,002, entitled "Universal Merchant Platform for Payment Authentication," by Keresman, III et al.;
U.S. Pat. No. 7,693,783, entitled "Universal Merchant Platform for Payment Authentication," by Balasubramanian et al.; and
U.S. Patent Publication No. 2011/0246324, entitled "Method and System for Processing PIN Debit Transactions", by Keresman, III et al., published Oct. 6, 2011.

BRIEF DESCRIPTION

In accordance with one aspect of the present application, a system for processing a transaction between a merchant and a consumer is provided. The system includes one or more processors of a third party programmed to receive data indicate of the security of a digital processing device being used by the consumer to carry out the transaction with the merchant. The one or more processors are further programmed to determine whether the digital processing device is secure using the received data. In response to determining the digital processing device is in insecure, the one or more processors abort the transaction. In response to determining the digital processing device is in secure, the one or more processors process the transaction by at least one of authenticating the consumer, authorizing the transaction using a payment processing supply chain, and capturing funds for the transaction using a payment processing supply chain.

In accordance with another aspect of the present application, a method for processing a transaction between a merchant and a consumer is provided. Data indicate of the security of a digital processing device being used by the consumer to carry out the transaction with the merchant is received. A determination as to whether the digital processing device is secure is made using the received data. In response to determining the digital processing device is in insecure, the transaction is aborted. In response to determining the digital processing device is in secure, the transaction is processed by at least one of authenticating the consumer, authorizing the transaction using a payment processing supply chain, and capturing funds for the transaction using the payment processing supply chain. The method is performed by one or more processors of a third party.

In accordance with another aspect of the present application, a system for processing a transaction between a merchant and a consumer is provided. The system includes one or more processors of a third party programmed to receive data indicate of the security of a digital processing device being used by the consumer to carry out the transaction with the merchant and to receive at least one of payment data and authentication data to process the transaction in parallel with the data indicate of the security of the digital processing device. The one or more processors are further programmed to determine whether the digital processing device is secure using the received data. In response to determining the digital processing device is in insecure, the one or more processors abort the transaction. In response to determining the digital processing device is in secure, the one or more processors process the transaction by: collecting authentication data for a debit card being used to complete the transaction from the consumer; translating between a credit authorization message for the transaction to a debit authorization message using the authentication data, the translating including combining data in the credit authorization message with the collected authentication data to create the debit authorization message; and transmitting the debit authorization message to a payment processor.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

Figure 1:
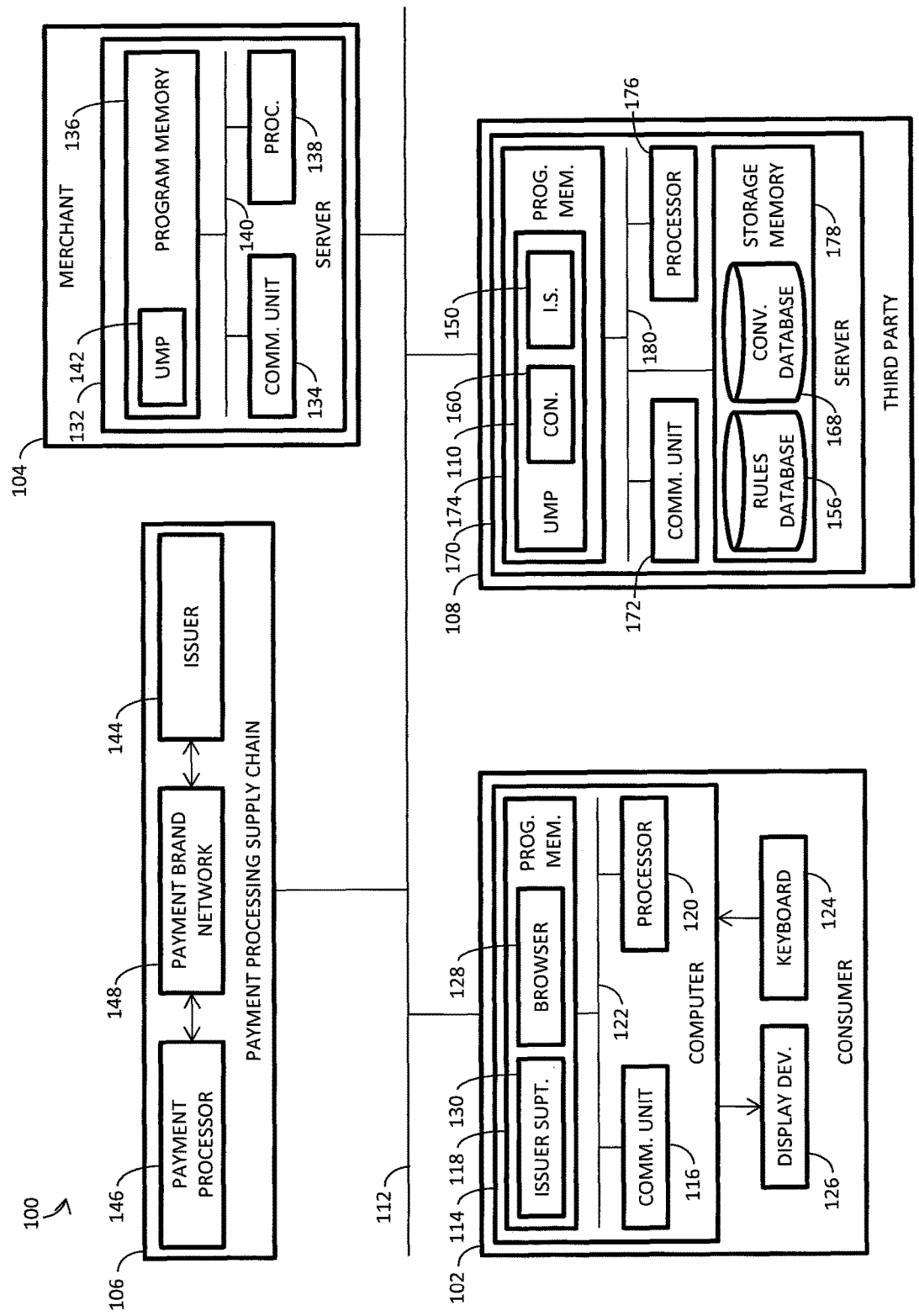
FIG. 1 is a block diagram of a system for processing personal identification number (PIN) debit transactions according to aspects of the present disclosure.

With reference to FIG. 1, a block diagram of a system 100 for processing personal identification number (PIN) debit transactions is shown. The system 100 can be an electronic commerce (e-commerce) system and/or mobile commerce (m-commerce) system. An e-commerce system facilitates transactions between a consumer and a merchant over the Internet, whereas an m-commerce system facilitates transactions between a consumer and a merchant over a mobile telecommunications network. The system 100 includes one or more consumers 102, one or more merchants 104, at least one payment processing supply chain 106, and a third party 108 providing a universal merchant platform (UMP) 110, interconnected by a communications network 112. The communications network 112 is typically the Internet or a mobile telecommunications network, but other communications networks are contemplated. For example, the communications network 112 may include one or more of a local area network, a wireless network, and the like.

The consumers 102 electronically select and purchase products and/or services from the merchants 104 over the communications network 112 using graphical user interfaces (GUIs), at least one for each of the merchants 104. The GUIs typically include merchant websites displayed using web browsers. However, it is to be appreciated that other GUIs are contemplated. For example, the GUIs can include non-web based merchant programs for purchasing products and/or services. These non-web based merchant program can be provided to consumers, for example, by physical media, such as compact discs (CDs), or by communications networks, such as the communications network 112.

After a consumer selects products and/or services to purchase from a merchant, the selection is electronically provided to the merchant. The selection can be automatically provided to the merchant upon selection or in response to an event, such as consumer selection of a "Checkout Button" in the GUI. Further, after the consumer selects the products and/or service to purchase, the consumer uses the GUI to provide a purchase request over the communications network 112 to the merchant. The purchase request initiates a transaction, such as an e-commerce or m-commerce transaction, with the merchant. For example, the consumer selects a "Checkout Button" in the GUI. The purchase request can include the selection, but the selection is typically provided to the merchant before, and independent of, the purchase request.

In some embodiments, the consumer uses the GUI to provide payment data, including payment type, to pay for the selected products and/or services to the merchant over the communications network 112. A payment type includes, for example, PIN debit card, credit card, and so on. The payment data can also, but need not, include data common to the different payment types supported by the merchant. For example, if the only payment types accepted by the merchant include PIN debit card and credit card, this other data can include one or more of card number, expiration date, the name of the cardholder, and the address of the cardholder. The payment data can be provided to the merchant in the purchase request or in a subsequent message.

Each of the consumers 102 is embodied by a digital processing device 114, such as a computer, smart phone, PDA, or the like, which is used by the consumer to conduct transactions with the merchants 104. The digital processing device 114 is connected to the communications network 112 and includes at least one communications unit 116, at least one program memory 118, and at least one processor 120, interconnected by at least system bus 122. Further, the digital processing device 114 is suitably associated with a user input device 124, such as a keyboard or mouse, and a user output device 126, such as a display device.

The communications unit 116 allows the digital processing device 114 to interact with components external to the digital processing device 114. For example, the communications unit 116 allows the digital processing device 114 to communicate with the user input device 124 and the user output device 126. As another example, the communications unit 116 allows the digital processing device 114 to communicate with other component connected to the communications network 112. The program memory 118 includes processor executable instructions to allow the consumer to carry out transactions. The processor executable instructions can include a browser module 128 embodying a web browser. Further, the processor executable instructions can include an issuer support module 130, discussed hereafter. The processor 120 executes the processor executable instructions on the program memory 118.

The merchants 104 provide the consumers 102 the GUIs, typically via the communications network 112. The GUIs typically include merchant websites displayed to the consumers 102 using web browsers. The GUIs allow the consumers 102 to electronically select and purchase products and/or services electronically over the communications network 112. The merchants 104 receive purchase requests over the communications network 112 from the consumers 102 after the consumers 102 select products and/or service to purchase.

When a merchant receives a purchase request from a consumer, the merchant employs the GUI to redirect the consumer from which the purchase request is received to a GUI of the UMP 110. The GUI of the UMP 110 is typically a webpage displayed in a web browser. As discussed below, the UMP 110 wholly or partially processes transactions to completion. In redirecting the consumer, the merchant provides any payment data received in the purchase request to the UMP 110. Redirection can be performed using, for example, an iFrame, a browser redirect, and so on. As should be appreciated, the iFrame embeds the GUI of the UMP 110 within the GUI of the merchant.

In some embodiments, intermediate receiving the purchase request and the redirecting, the merchant GUI collects payment data, which is provided to the UMP 110 during redirection. As noted above, the purchase request need not, but can, include payment data. This collected payment data can be in addition to any payment data in the purchase request. For example, where the payment request does not include any payment data, the GUI of the merchant can be employed to collect a payment type to be used to pay for the selected products and/or services and, in some embodiments, other payment data common to the different payment types supported by the merchant. As another example, where the payment request includes payment type, the GUI of the merchant can be employed to collect other payment data common to the different payment types supported by the merchant.

In some embodiments, redirection to the UMP 110 is only performed for certain payment types supported by the merchant. The merchant without use of the UMP 110 handles other payment types. For example, if a consumer means to pay for products and/or services using a PIN debit card, the merchant redirects the consumer to the UMP 110, as described above. However, if the consumer means to pay for products and/or services using a credit card, the merchant handles the transaction locally without use of the UMP 110.

To use the UMP 110, the merchants 104 suitably register with the UMP 110. This may include the merchants 104 providing merchant data (e.g., financial data, physical address, category of goods or services sold, Internet address, email address, etc.) to the UMP 110. Typically, the merchant data is provided over the communications network 112 via a GUI, such as a web interface, offered by the UMP 110. However, other means of providing the merchant data, such as via a telephone, are contemplated. Additionally, the merchant data is suitably modifiable, optionally via the GUI and/or the communications network 112. In certain embodiments, registration may further include signing and/or executing an agreement of the third party 108 providing the UMP 110.

Further, to use the UMP 110, the merchants 104 suitably augment their GUI and/or backend systems supporting the GUIs to employ the UMP 110. For example, a merchant may add a hosted iFrame linking their GUI to the UMP 110. Advantageously, this allows easy integration with the UMP 110, especially during the submission of payment data. As another example, a merchant may modify their backend system to forward all debit PIN transactions to the UMP 110 for processing.

Each of the merchants 104 is embodied by one or more digital processing devices 132, such as servers, which are used by the merchant to conduct transactions with the consumers 102. The digital processing devices 132 are connected to the communications network 112 and each includes at least one communications unit 134, at least one program memory 136, and at least one processor 138, interconnected by at least system bus 140. Where the digital processing devices 132 include a plurality of digital processing devices, the digital processing devices are interconnected by at least one communications network.

The communications unit 134 allows the digital processing device to interact with components external to the digital processing device. For example, the communications unit 134 allows the digital processing device to communicate with other digital processing devices of the merchant or other component connected to the communications network 112. The program memory 136 includes processor executable instructions to allow the merchant to interface with the consumers 102 and the UMP 110. The processor executable instructions can include a UMP module 142 interfacing with the UMP 110. The processor 138 executes the processor executable instructions on the program memory 136.

The payment processing supply chain 106 facilitates the transfer of funds from the consumers 102 to the merchants 104. As shown the payment processing supply chain 106 suitably includes one or more issuers 144, one or more payment processors 146, and one or more payment brand networks 148. In certain embodiments, the payment processing supply chain 106 further includes one or more payment gateways (not shown) providing the merchants 104 with an interface to the payment processors 146.

The issuers 144 issue payment instruments, such as prepaid/stored value cards, debit cards and/or credit cards, to the consumers 102. In that regard, the issuers 144 have an account relationship with the consumers 102, and one of the issuers 144 suitably issues each payment instrument processed by the system 100. One or more servers suitably embody each of the issuers 144.

The payment processors 146 process purchase and payment transactions and one or more servers suitably embody each of the payment processors 146. The payment processors 146 include at least one payment processor implementing an Internet acquiring platform and, optionally, at least one payment processor implementing a debit acquiring platform. Insofar as the payment processors 146 do not include a payment processor implementing a debit acquiring platform, the third party 110 carries out this role. Although not necessary, a payment processor can implement both an Internet acquiring platform and a debit acquiring platform. Each of the merchants 104 typically employs one or more of the payment processors 146 (e.g., as their financial institution and/or acquiring bank), where the payment processors for each of the merchants implement an Internet acquiring platform and, optionally, a debit acquiring platform.

A debit acquiring platform processes purchase and payment transactions initiated at physical world (card present) merchants and an Internet acquiring platform processes purchase and payment transactions initiated at e-commerce (card not present) merchants. Typically, the messages used by debit acquiring platforms are different from the messages used by Internet acquiring platforms. Further, debit networks through which the messages are routed, discussed below, determine the messages used by debit acquiring platforms. Debit acquiring platforms typically process debit card transactions using a single message, hereafter referred to as a debit authorization message. The debit authorization message is for the purpose of requesting authorization to make a purchase, and, for pay as you go transactions, if the request is approved, the authorization message also serves as the posting record.

Internet acquiring platforms typically process credit card transactions using a dual message structure involving a credit authorization message and a credit settlement message. The credit authorization message places a hold on funds, and the credit settlement message captures funds from the affected account. Typically, the credit settlement messages are submitted in bulk (i.e., batch submission) after a predetermined time, such as the end of a business day. In certain embodiments, the messages employed by the payment processors 146 are in ISO 8583 format or another format proprietary to the entity processing the transaction.

The payment brand networks 148 govern and process purchase and payment transactions. In this regard, the payment brand networks 148 generally employ network switches to process transactions and route them to the issuers 144. Suitably, the payment brand networks 148 include at least one debit network. Debit networks include debit network switches to process transactions and route them to the issuers 144 for approval and posting. An example of a debit network is a PIN debit network. A PIN debit network is a payment network that governs and processes purchase and payment transactions where the consumer is validated through the combination of presentment of a plastic card and entry of a PIN. Typical debit payment brand networks include STAR, NYCE, and INTERLINK. The payment brand networks 148 suitably include one or more servers governing and processing purchase and payment transactions.

The third party 108 facilitates the completion of transactions between the consumers 102 and the merchants 104 by way of the UMP 110. The UMP 110 serves as a centralized merchant processing system to process electronic transactions through any payment brand network using a single platform. In this regard, it enables merchants to process payments, regardless of which payment brand network they are to be routed through, with a single implementation. For more information pertaining to the basic functionality of the UMP 110, attention is directed to, for example, U.S. Pat. No. 7,051,002 entitled "Universal Merchant Platform for Payment Authentication," by Keresman, III et al., and U.S. Pat. No. 7,693,783 entitled "Universal Merchant Platform for Payment Authentication," by Balasubramanian et al., both incorporated herein by reference in their entireties. The UMP 110 can also be employed to process e-commerce transactions involving debit cards, such as PIN debit cards, with minimal modification to existing infrastructure.

During the processing of a transaction, the UMP 110 receives consumers redirected thereto by the merchants 104 and any payment data sent with the consumers. Upon receiving a consumer, the UMP 110 determines how to process the transaction and collects any payment data needed to make such a determination from the consumer. This payment data can be collected from payment data received with the consumer or using the GUI of the UMP 110. The determination as to how to process the transaction includes determining the payment type, such as credit card or PIN debit card.

In some embodiments, the determination as to how to process the transaction further includes determining whether to enable issuer support. Otherwise, it is assumed that issuer support is enabled for all issuers. Issuer support assesses the digital processing devices of the consumers 102 to ensure they're secure.

Determining whether to enable issuer support typically entails collecting data regarding whether the issuer of a payment instrument, such as a credit or PIN debit card, being used to complete the transaction has registered with the UMP 110 and enabled issuer support. Therefore, sufficient data to identify the issuer of the payment instrument is collected. Typically, this data includes card number. Further, it will be appreciated that while issuer support is directed towards payment types in which payment instruments, such as credit and PIN debit cards, are issued, it is more broadly applicable to any payment type.

In some embodiments, consumers can specify whether to enable issuer support, whereby determining whether to enable issuer support additionally or alternatively includes collecting data regarding whether the consumer of a payment instrument being used to complete the transaction has registered with the UMP 110 and enabled issuer support. Thus, sufficient data to identify the consumer of the payment instrument is collected.

After determining how to process the transaction, the UMP 110 assesses the security of the digital processing device of the consumer where issuer support is enabled. This assessment is performed using collected data about the digital processing device of the consumer. In some embodiments, at least some of this data is collected when the consumer is redirected to the UMP 110 or in parallel with the determination regarding how to process the transaction. If the digital processing device of the consumer is found insecure, the transaction is aborted and the consumer is notified thereof. For example, the GUI of the UMP 110 can display a message to the consumer that the digital processing device of the consumer is insecure.

If the digital processing device of the consumer is found secure or issuer support is disabled, the UMP 110 collects data needed to process the transaction and partially or wholly completes the transaction using the collected data. The data can be collected from previously collected or received data and/or using the GUI of the UMP 110 from the consumer. As an example, the UMP 110 collects payment data needed for a PIN debit transaction and processes the transaction. As another example, the UMP 110 collects payment data needed for an authenticated payment initiative (e.g., 3D secure) and completes the transaction using the collected payment data. Although the UMP 110 can be employed to wholly complete a transaction, it is typically employed to partially complete a transaction. In that regard, the merchant suitably performs the authorization and capture of funds typical of credit card transactions and offloads, for example, authentication or payment selection to the UMP 110.

Figure 2:
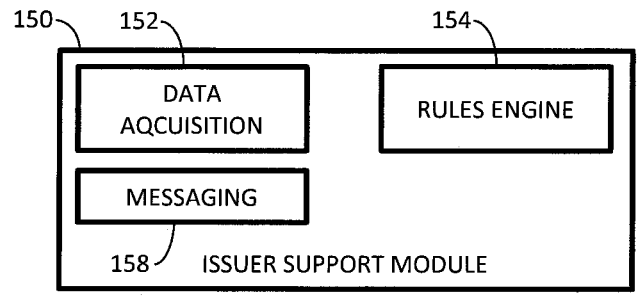
FIG. 2 is a block diagram of the functional components of an issuer support module of a universal merchant platform (UMP) according to aspects of the present disclosure.

To assess the security of the digital processing device of a consumer, the UMP 110 is extended with an issuer support module 150, a detailed view of which is shown in FIG. 2. For each transaction, the issuer support module 150 collects data regarding the security and integrity of the digital processing device of the consumer using data acquisition sub-module 152 of the issuer support module 150. Some or all of this data can be obtained using an issuer support module 150 on the digital processing device of the consumer. The issuer support module 150 can be pre-loaded on the digital processing device or conveyed to the consumer by way of the GUI of the UMP 110 (e.g., as a JavaScript).

The collected data can include data about one or more of the digital processing device the consumer is using, such as the unique identification signature of the digital processing device (e.g., by any well-known method), the true location of the digital processing device (e.g., by determining the presence of proxy server use and the analysis of the real Internet Protocol (IP) address), the presence of malware on the digital processing device that could be used to capture keystrokes and mouse clicks, the presence of screen scraping or "man in the middle" attacks, the history of use of the digital processing device, transaction amount, and the method for determining credentials (see the credentialing applications below).

After collecting the data regarding the security and integrity of the digital processing device, the collected data is processed to assess whether the digital processing device of the consumer is secure. In some embodiments, this is performed by a rules engine 154 of the issuer support module 150 using one or more rules in a rules database 156. The rules engine 154 applies rules in the rules database 156 to the collected data to determine a security score of the digital processing device. The security score represents how secure the digital processing device. If the security score exceeds a threshold, the digital processing device of the consumer is deemed secure. Otherwise, it is deemed insecure. The threshold is set by, for example, an operator of the issuer support module 150 or the issuer themselves.

An example rule could decrease the score if a man in the middle attack is detected or malware is detected. As another example, a rule could increase the score if the purchase amount is less than a threshold and decrease it if the purchase amount is greater than a threshold. As another example, a rule could decrease the score if the consumer is behind a proxy server or the location of the consumer is outside a known region of the consumer. As another example, a rule could reduce the score if the signature of the digital processing device is unrecognized among a list of registered digital processing devices for the consumer. As another example, a rule could increase or decrease the score depending upon the credentialing application being used, where different credential applications are assigned different security levels.

When a digital processing device is deemed insecure, the transaction is rejected. Further, a notification can be sent to the consumer or the issuer when a digital processing device is deemed insecure or suspicious. The notification can notify the consumer to call the issuer to complete the transaction. A transaction is suspicious when it was deemed secure but within a predetermined amount of the threshold, the predetermined amount set by an operator of the issuer support module 150 or the issuer themselves. When a digital processing device is deemed secure, the transaction is accepted. Further, a notification can be sent to the consumer or the issuer indicating the transaction. A messaging sub-module 158 of the issuer support module 150 can send the notifications using a short message service (SMS) message, an email message, or any other type of message.

As noted above, in some embodiments, issuers register with the UMP 110. In such embodiments, issuers can select one or more of whether to enable issuer support, the rules in the rules database 156 to apply, the weighting of the different rules, the notifications to send to consumers and/or the issuers, and the other parameters pertaining to the issuer support module 150. Further, in some embodiments, consumers register for use with the UMP 110. As with issuers, consumers can select one or more of whether to enable issuer support, the rules in the rules database 156 to apply, the weighting of the different rules, the notifications to send to consumers and/or the issuers, and the other parameters pertaining to the issuer support module 150.

Figure 3:
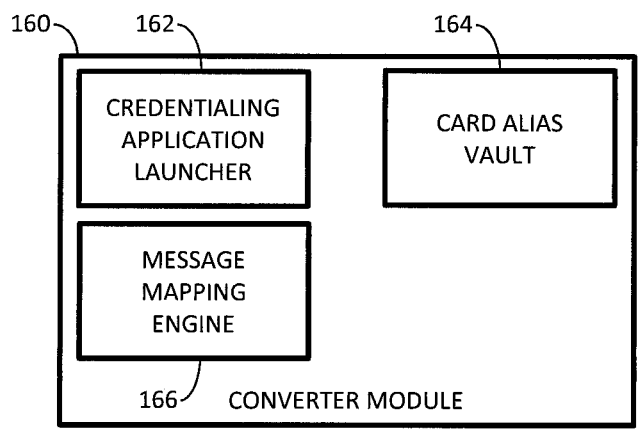
FIG. 3 is a block diagram of the functional components of a converter module of a UMP according to aspects of the present disclosure.

To process transactions for PIN debit transactions, the UMP 110 is extended with a converter module 160, a detailed view of which is shown in FIG. 3. Although described below, additional detail regarding the converter module 160 can be found in U.S. Patent Publication No. 2011/0246324, entitled "Method and System for Processing PIN Debit Transactions", by Keresman, III et al., published Oct. 6, 2011, incorporated herein by reference. As noted above, after determining how to process a transaction, and if the digital processing device of the consumer is found secure or issuer support is disabled, the UMP 110 partially or wholly completes the transaction using data collected by the UMP 110 which is needed to process the transaction. The converter module 160 uses this collected data to facilitate completion of the transaction.

The converter module 160 generally acts as a "black box" that accepts messages in a first format, such as credit card 0100 series messages, from the merchants 104 and translates them to a second format, such as debit card 0200 series messages, which payment processors can send to the various payment brand networks for routing to issuers. Further, the converter module 160 is authentication solution agnostic, and it will launch the appropriate authentication solution for each consumer based on the instructions of the issuer or payment brand network. For example, the converter module 160 can handle PIN based authentication or other types of authentication. Suitably, the converter module 160 performs the forgoing functions using a credentialing application launcher sub-module 162, a card alias vault sub-module 164, and a message mapping engine sub-module 166.

The credentialing application launcher sub-module 162 generally determines both routing data for the transaction (i.e., the payment brand network to employ) and a credentialing application for the transaction. A credentialing application is an application used to collect credentials, such as a PIN, from a consumer at the time each purchase or payment is initiated and is suitably approved by a payment brand network or issuer. Credentialing applications for Acculynk, HomeATM, MagTek, US Encode, Adaptive Payments, and Verient are contemplated. In certain embodiments, the determination is based on collected data. For example, the determination may be made by using the card number to perform a lookup in one or more bank identification number (BIN) tables. A BIN table contains the BINs eligible for routing to the payment brand networks 148 and indicates which credentialing application is to be used for each and which payment brand network each is to be routed to. Typically the BIN tables are stored in a database or memory, such as a converter database 168, and provided by the payment processors 146.

After determining the routing data and the credentialing application for the transaction, the credentialing application launcher sub-module 162 runs the credentialing application to acquire authentication data from the consumer. Authentication data is any data collected from the consumer deemed by the issuer of the payment instrument to be sufficient to authenticate the consumer. Suitably, authentication data is acquired through coordination between the merchant and the UMP 110, where the consumer is presented with a GUI of the UMP 110 prompting them to submit the relevant authentication data, such as a debit card PIN.

When the consumer submits the authentication data and the credentialing application receives the authentication data, the credentialing application processes the authentication data. Depending upon the determined credentialing application, processing causes consumer authentication to occur at this point or the credentials to be formatted for authentication by the issuer of the payment instrument during authorization processing, discussed below. As to the former, it is contemplated that the authentication data is submit to, for example, the issuer for verification over the communications network 112. The authentication data, optionally including authentication results, is then saved for subsequent use in a database or a memory, such as the converter database 168. As discussed hereinafter, this data will be appended to and/or substituted for data delivered in a credit authorization request message, such as a credit card 0100 message, that is received from an Internet acquiring platform of a payment processor, for inclusion in a debit authorization request message, such as a debit card 0200 message.

Subsequent to receiving the authentication data, the card alias vault sub-module 164 may provide the merchant with an alias account number. For example, the card alias vault sub-module 164 may be adapted to generate a single use primary account number (PAN). In some embodiments, the card alias vault sub-module 164 provides the merchant with the alias account number by redirecting the consumer back to the GUI of the merchant. Suitably, the card alias vault sub-module 164 maintains a record of the relationship between the alias account number and the transaction and/or authentication data in a database or memory, such as the converter database 168. In that regard, the alias account number is suitably correlated with a real account number.

The merchant then uses this alias account number in a credit authorization message. Suitably, the merchant generates the credit authorization message using the alias account number and submits the credit authorization message to its Internet acquiring platform, optionally via a payment gateway. Based on the alias account number, the Internet acquiring platform routes the transaction to the message mapping engine sub-module 166. For example, the transaction is routed to the UMP 110 using a BIN number (unique to the UMP 110) of the alias account number. As another example, the Internet acquiring platform can request the UMP 110 to identify the transaction as a debit transaction.

Upon receiving the credit authorization message, the message mapping engine sub-module 166 converts the credit authorization message to a debit authorization message for submission to the debit acquiring platform. The debit authorization message suitably includes the payment type for the transaction. To convert the credit authorization message, the message mapping engine sub-module 160 merges and/or replaces data contained in the credit authorization message with the authentication data captured and delivered by the credentialing application launcher sub-module 162 to create the debit authorization message. In certain embodiments, the message mapping engine sub-module 166 also merges and/or replaces data contained in the credit authorization message with the routing data determined by the credentialing application launcher sub-module 162. The debit authorization messages are suitably tailored to the corresponding debit networks through which the debit authorization messages are to be routed. In certain embodiments, a rules engine may be employed to facilitate this tailoring. In that regard, debit network specific rules for converting credit authorization messages to debit authorization messages may be stored in a database or memory, such as the converter database 168. Furthermore, the message mapping engine sub-module 166 may accommodate e-commerce transaction types, such as delayed and recurring payments, that are not supported by the debit networks.

After generating the debit authorization message, it is sent to the debit acquiring platform to continue the transaction processing. The debit acquiring platform, in turn, sends the debit authorization message to the appropriate payment brand network for approval and posting by the appropriate issuer of the payment instrument. A debit authorization response message, such as a debit card 0210 message, is then returned back to the message mapping engine sub-module 166 by way of the debit acquiring platform. The message mapping engine sub-module 166 converts the debit authorization response message to a credit authorization response message, such as a credit card 0110 response message. As above, a rules engine employing debit network specific rules may be employed. While converting the debit authorization response message, debit specific data is removed and stored in a database or memory, such as the converter database 168, until the merchant's end of day period is complete. The message mapping engine sub-module 166 then sends the credit authorization response message to the Internet acquiring platform, which, in turn, returns it to the merchant. The consumer is notified of the success or failure of the authorization request by the GUI of the merchant.

Subsequent to receiving the credit authorization response message, typically at the end of each business day, the merchant undergoes a batch settlement process to capture funds for credit card based transactions. During settlement, settlement messages are sent in bulk for authorized transactions, including debit transactions, from the merchant to the Internet acquiring platform. The Internet acquiring platform groups the transactions according to recipient and sends settlement messages for the transactions (e.g., credit card transactions) to the corresponding recipient. For credit card based transactions the recipient is typically a corresponding payment brand network, and for debit card based transactions, the recipient is typically the third party 108 (more particularly the UMP 110).

The UMP 110, upon receiving settlement messages for pay as you go debit transactions, discards the settlement messages or saves them in a database or memory, such as the converter database 168. No other action is required for these settlement messages because funds are captured during authorization. Further, the UMP 110, upon receiving settlement messages for other debit transactions, employs the message mapping engine 166 to convert the settlement messages to the appropriate format for corresponding debit networks. As above, the conversion is suitably performed using a rules engine and debit network specific rules.

In addition to the foregoing settlement messages, reconciliation messages for debit transactions may be sent from the payment brand networks to the debit acquiring platform, and automated clearing house (ACH) settlement messages may be sent by the payment brand networks 148 to the issuers 144 and the debit acquiring platform to effect settlement of the transactions.

Based on the settlement messages sent to the Internet acquiring platform and the reconciliation messages sent to the debit acquiring platform, reconciliation is performed by the one or more payment processors providing the Internet acquiring platform and the debit acquiring platform. The Internet acquiring platform and debit acquiring platform for a debit transaction will each have half of the reporting necessary to reconcile the settlement related to the debit transactions. Notably, whereas the foregoing settlement and reconciliation processes, other than removing debit transactions, are common place in e-commerce systems, the present reconciliation is new to the present disclosure.

In some embodiments, during the processing of transactions, the message mapping engine sub-module 166 collects data pertaining to the transactions and stores it for fraud analysis in a database, such as the converter database 168. This data may include transaction data that cannot be passed in the messages moving through the message mapping engine sub-module 166. Further, although the discussion heretofore focuses on the authorization and capture of funds, in certain embodiments, charge backs can similarly be handled according to the foregoing discussion. In that regard, the Internet acquiring platform supplies the alias account number used for the transaction in the merchant and Internet acquiring platform records. The chargeback may come through with the real card account number.

The third party 108 is embodied by one or more digital processing devices 170, such as a server, which are used by the third party 108 to facilitate transactions between the consumers 102 and the merchants 104. The digital processing devices 170 are connected to the communications network 112 and each include at least one communications unit 172, at least one program memory 174, at least one processor 176 and at least one storage memory 178, interconnected by at least system bus 180. Where the digital processing devices 170 include a plurality of digital processing devices, the plurality of digital processing devices are interconnected by at least one communications network.

The communications unit 172 allows the digital processing device to interact with components external to the digital processing device. For example, the communications unit 172 allows the digital processing device to communicate with other digital processing devices of the third party 108 or other component connected to the communications network 112. The program memory 174 includes processor executable instructions embodying the UMP 110. Where the third party 108 includes a plurality of digital processing devices, the UMP 110 can be distributed across all or a subset of the plurality of digital processing devices. The storage memory 178 includes the databases of the third party 108 (e.g., the rules database 156 and the converter database 168). Where the third party 108 includes a plurality of digital processing devices, the databases of the third party 108 can be distributed across all or a subset of the digital processing devices. The processor 176 executes the processor executable instructions on the program memory 174.

Figure 4:
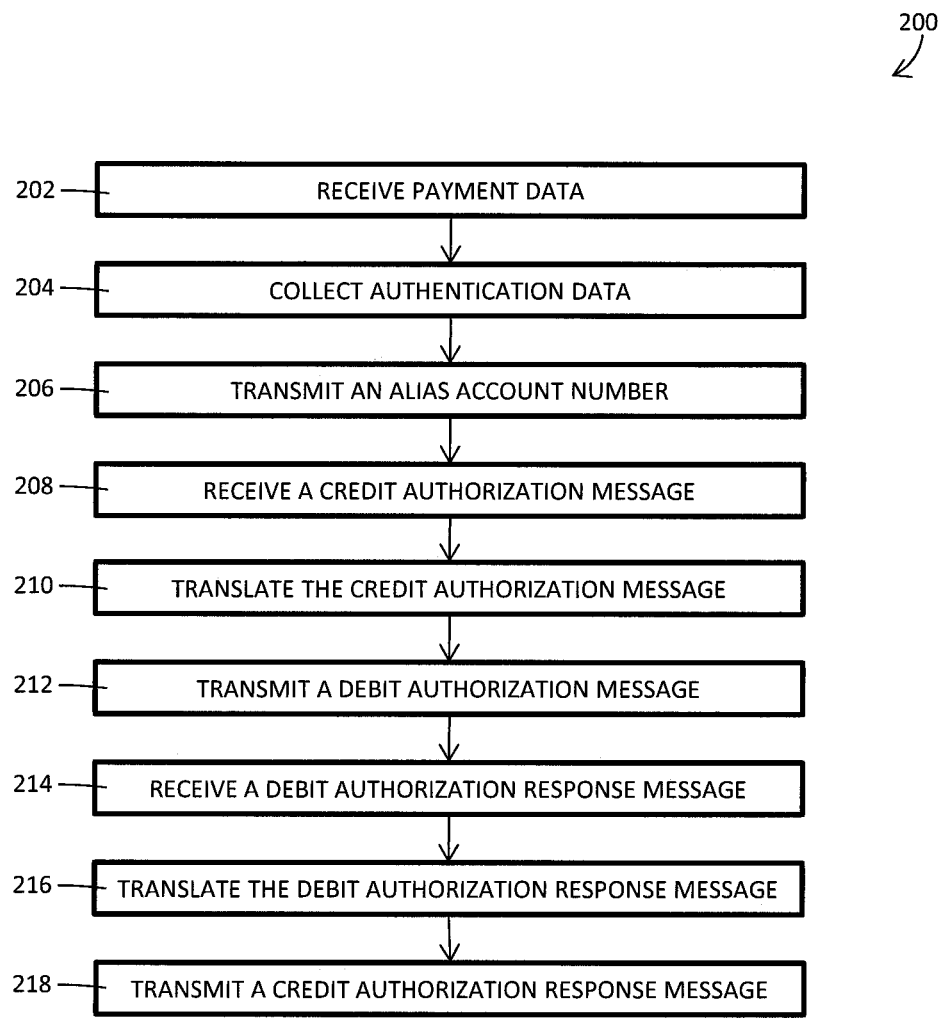
FIG. 4 is a method for processing PIN debit transactions according to aspects of the present disclosure.

With reference to FIG. 4, a block diagram of a method 200 of processing PIN debit card transaction between a merchant and a consumer is provided. Suitably, the method 200 is performed by the by the converter module 160 of the UMP 110. Further, it is to be appreciated that the substance of the method 200 was described above in connection with the converter module 160. That is to say, the Actions hereinafter described are to be understood as paralleling like Actions discussed above.

To begin, payment data for the consumer is received 202, typically via the communications network 112. Suitably, the payment data identifies a debit card, such as a PIN debit card, via, for example, a card number and an expiration date. As noted above, the collected payment data is based upon the payment type received from the consumer via the merchant. Thereafter, authentication data for the debit card is collected 204 from the consumer. Typically, the authentication data is indicative of a PIN number, but other data appropriate for authentication is contemplated. As discussed above, authentication data is suitably collected using a credentialing application approved by one of the issuers 144. Further, a unique alias account number for the transaction is generated and transmitted 206 to the merchant. The alias account number is, for example, a PAN or the like.

The merchant typically uses the alias account number to generate a credit authorization request, which is submitted to the merchant's payment processor and routed back to the converter module 160. In that regard, a credit authorization message including the alias account number from the merchant is received 208. The credit authorization message is then translated 210 to a debit authorization message using the authentication data. In certain embodiments, this entails merging the credit authorization message with the authentication data and/or employing a rules engine to perform the translation, where the rules engine uses debit network specific rules. The debit authorization message is transmitted 212 to the payment processor of the merchant. For pay as you go transactions this leads to the simultaneous authorization and capture of funds from the issuing bank.

Responsive to the debit authorization message, a debit authorization response message is received 214 from the payment processor. This message is translated 216 to a credit authorization response message, which is transmitted 218 to the merchant. In certain embodiments, a rules engine is employed to perform the translation, where the rules engine uses debit network specific rules. The merchant then employs the end of day settlement process typical of credit card transactions. During settlement, the pay as you go debit transactions are removed from the settlement process since settlement occurs during authorization for debit transactions. For remaining debit transactions, settlement messages specific to corresponding debit networks are generated and sent to the corresponding debit networks.

Figure 5:
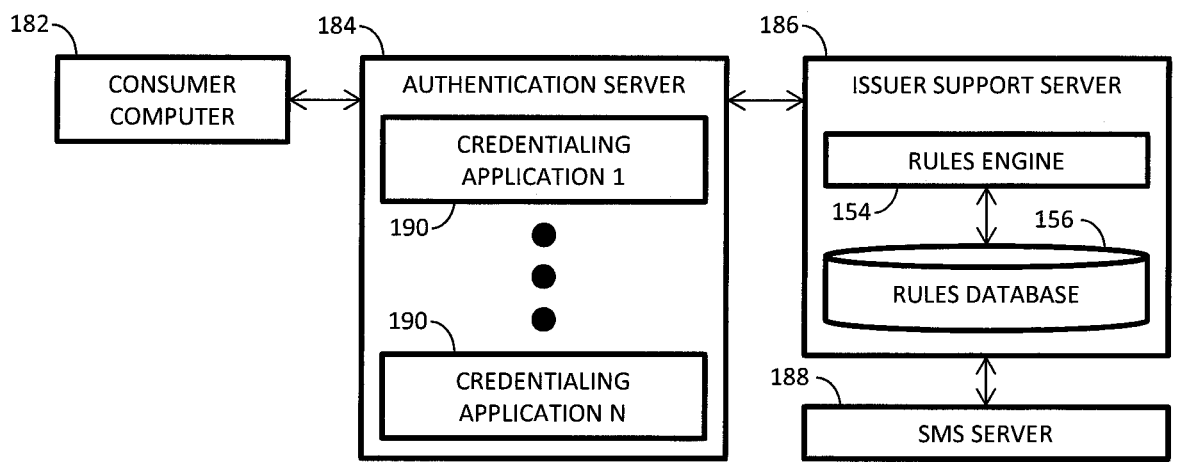
FIG. 5 is an example of issuer support for PIN debit authentication according to aspects of the present disclosure.

With reference to FIG. 5, an example of issuer support for PIN debit authentication is provided. After a consumer 182 initiates a transaction with a merchant, for example, by submitting a purchase request to the merchant, the consumer is redirected to a webpage of the UMP 110. As illustrated, the UMP 110 is at least partially distributed across an authentication server 184, an issuer support server 186 and a messaging server 188, where the converter module 160 is suitably part of the authentication server 184 and the issuer support module 150 is distributed across the authentication server 184, the issuer support server 186 and the messaging server 188. The webpage to which the consumer is redirected is provided by the authentication server 184.

When the UMP receives the consumer 182, it determines how to process the transaction and collects any data needed to make such a determination. In this example, it is determined that the transaction needs to be processed as a PIN debit transaction. Assuming issuer support is enabled, data related to the digital processing device of the consumer 182 is collected by the authentication server 184 using the web browser of the consumer 182. While this is typically done wholly after determining that the transaction is to be processed using PIN debit or some other payment type supporting issuer support, in some embodiments, all or some of this issuer support data is collected when the consumer 182 is redirected to the UMP 110 or in parallel with the determination regarding how to process the transaction.

This collected issuer support data is then forwarded, optionally with other data, to the issuer support server 186 where the issuer support module 150 (e.g., the rules engine 154 of the issuer support module 150) determines whether the digital processing device of the consumer 182 is secure. The result of this determination is returned to the authentication server 184. If the digital processing device is insecure, the consumer 182 can be notified thereof by the authentication server 184 and the transaction can be aborted. Further, notifications can be sent, for example, to the consumer 182 and/or issuer using the messaging server 188. If the digital processing device is secure, the method 400, described above, is performed using one of a plurality of different credentialing applications 190 supported by the converter module 160.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C, and the like; a user input device includes one or more of a mouse, a keyboard, a touch screen display, one or more buttons, one or more switches, one or more toggles, and the like; a database includes at least one memory; and a display includes one or more of a LCD display, an LED display, a plasma display, a projection display, a touch screen display, and the like The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for processing a personal identification number (PIN) debit transaction between a merchant and a consumer that is conducted via an e-commerce channel or an m-commerce channel, said system comprising:
one or more processors of a third party associated with a universal merchant platform (UMP) programmed to:
receive, from a merchant, merchant data associated with registration for the UMP, wherein the merchant data comprises a specification of a plurality of rules to apply to a PIN debit transaction between the merchant and the consumer to determine security of a digital processing device and a weighting associated with the plurality of rules;
store the specification of the plurality of rules in a rules database;
during processing of a transaction that is conducted via an e-commerce channel or an m-commerce channel by a consumer:
determine how to process the transaction between the merchant and the consumer, wherein, when determining how to process the transaction, the one or more processors:
determine a payment type to be used by the consumer for the transaction;
in response to determining that the payment type to be used by the consumer for the transaction is a PIN debit card, assess security of a digital processing device associated with the consumer and being used by the consumer to carry out the transaction based on the merchant data associated with registration for the UMP, wherein, when assessing the security of the digital processing device, the one or more processors:
receive, from the digital processing device and via a communications network, data regarding the digital processing device being used by the consumer to carry out the transaction between the merchant and the consumer, wherein the data regarding the digital processing device is obtained by the digital processing device;
determine whether the digital processing device is secure using the received data regarding the digital processing device being used by the consumer to carry out the transaction between the merchant and the consumer by:
applying, via a rules engine, the plurality of rules, according to the specification of the plurality of rules, to the received data to generate a score indicative of the security of the digital processing device; and
applying, via the rules engine, a threshold to the generated score to determine whether the digital processing device is secure;
in response to determining the digital processing device is insecure, abort processing of the transaction; and
in response to determining the digital processing device is secure, completing processing of the transaction, wherein when completing processing of the transaction, the one or more processors:
provide a webpage of the UMP to the consumer after initiating the transaction;
receive payment data for the consumer via the webpage, said payment data identifying the PIN debit card;
receive authentication data for the debit card from the digital processing device associated with the consumer;

transmit an alias account number of a real account number to the merchant, the alias account number unique to the transaction relative to other transactions;

receive a credit authorization message including the alias account number from the merchant, the credit authorization message requesting authorization to capture funds from the alias account number;

translate the credit authorization message to a debit authorization message using the authentication data, the debit authorization message requesting authorization to capture funds from the real account number:

transmit the debit authorization message to a debit acquiring platform;

receive a debit authorization response message from the debit acquiring platform;

translate the debit authorization response message to a credit authorization response message; and transmit the credit authorization response message to the merchant;

wherein the rules include:

a rule decreasing the score if malware is detected based on the data regarding the digital processing device being used by the consumer to carry out the transaction between the merchant and the consumer;

a rule decreasing the score if a screen scrapping attack is detected based on the data regarding the digital processing device being used by the consumer to carry out the transaction between the merchant and the consumer; and a rule decreasing the score if a man in the middle attack is detected based on the data regarding the digital processing device being used by the consumer to carry out the transaction between the merchant and the consumer.

2. The system according to claim 1, wherein the rules include:

a rule decreasing the score if a true location of the digital processing device indicates the digital processing device is determined to be located outside a known region of the consumer based on the data regarding the digital processing device being used by the consumer to carry out the transaction between the merchant and the consumer; and wherein the one or more processors are further programmed to:

determine the true location of the digital processing device by detecting a presence of a proxy server and analyzing a real Internet Protocol (IP) address of the digital processing device.

3. The system according to claim 1, wherein the one or more processors are further programmed to:

in response to determining the digital processing device is insecure, notify the consumer or an issuer of a payment instrument being used to complete the transaction.

4. The system according to claim 1, wherein collection of the authentication data for the debit card from the consumer includes:

selecting one of a plurality of different credentialing applications based on the payment data, said credentialing applications operative to collect authentication data from the consumer;

wherein the collected authentication data is collected according to the selected credentialing application.

5. The system according to claim 4, wherein the data regarding the digital processing device includes data regarding the selected credentialing application.

6. A method for processing a personal identification number (PIN) debit transaction between a merchant and a consumer that is conducted via an e-commerce channel or an m-commerce channel, said method comprising:

receiving merchant data associated with registration for a universal merchant platform (UMP) from the merchant, the merchant data comprising a specification of a plurality of rules in a rules database to apply to a PIN debit transaction between the merchant and the consumer to determine security of a digital processing device and a weighting associated with the plurality of rules;

storing the specification of the plurality of rules in a rules database;

during processing of a transaction that is conducted via an e-commerce channel or an m-commerce channel by a consumer;

providing a webpage of the UMP to the consumer after initiating the transaction;

determining how to process the transaction between the merchant and the consumer, comprising:

determining a payment type to be used by the consumer for the transaction;

in response to determining that the payment type to be used by the consumer for the transaction is a PIN debit card, assessing security of a digital processing device associated with the consumer and being used by the consumer to carry out the transaction based on the merchant data associated with registration for the UMP, comprising:

receiving, from the digital processing device and via a communications network, data regarding the digital processing device being used by the consumer to carry out the transaction between the merchant and the consumer, wherein the data regarding the digital processing device is obtained by the digital processing device;

determining whether the digital processing device is secure using the received data regarding the digital processing device being used by the consumer to carry out the transaction between the merchant and the consumer by:

applying, via a rules engine, the plurality of rules to the received data, according to the specification of the plurality of rules, to generate a score indicative of the security of the digital processing device; and applying, via the rules engine, a threshold to the generated score to determine whether the digital processing device is secure;

in response to determining the digital processing device is insecure, aborting processing of the transaction; and in response to determining the digital processing device is secure, completing processing of the transaction, wherein completing processing of the transaction comprises:

receiving payment data for the consumer, said payment data identifying the PIN debit card;

receiving authentication data for the debit card from digital processing device associated with the consumer;

transmitting an alias account number of a real account number to the merchant, the alias account number unique to the transaction relative to other transactions;

receiving a credit authorization message including the alias account number from the merchant, the credit authorization message requesting authorization to capture funds from the alias account number;

translating the credit authorization message to a debit authorization message using the authentication data, the debit authorization message requesting authorization to capture funds from the real account number;

transmitting the debit authorization message to a debit acquiring platform;

receiving a debit authorization response message from the debit acquiring platform;

translating the debit authorization response message to a credit authorization response message; and transmitting the credit authorization response message to the merchant;

wherein the method is performed by one or more processors of a third party, and the rules include:

a rule decreasing the score if malware is detected based on the data regarding the digital processing device being used by the consumer to carry out the transaction between the merchant and the consumer;

a rule decreasing the score if a screen scrapping attack is detected based on the data regarding the digital processing device being used by the consumer to carry out the transaction between the merchant and the consumer; and a rule decreasing the score if a man in the middle attack is detected based on the data regarding the digital processing device being used by the consumer to carry out the transaction between the merchant and the consumer.

7. The method according to claim 6, further including:
receiving at least one of payment data and authentication data to process the transaction in parallel with the data regarding the digital processing device.

8. The method according to claim 6, further including:
in response to determining the digital processing device is insecure, notifying the consumer or an issuer of a payment instrument being used to complete the transaction.

9. The method according to claim 6, wherein collecting of the authentication data for the debit card from the consumer includes:

selecting one of a plurality of different credentialing applications based on the payment data, said credentialing applications operative to collect authentication data from the consumer;

wherein the collected authentication data is collected according to the selected credentialing application.

10. The method according to claim 9, wherein the data regarding the digital processing device includes data regarding the selected credentialing application.

\* \* \* \* \*